June 24, 1941.  D. HAYES  2,247,172
REEL DRIVE FOR COMBINES
Filed Feb. 5, 1940
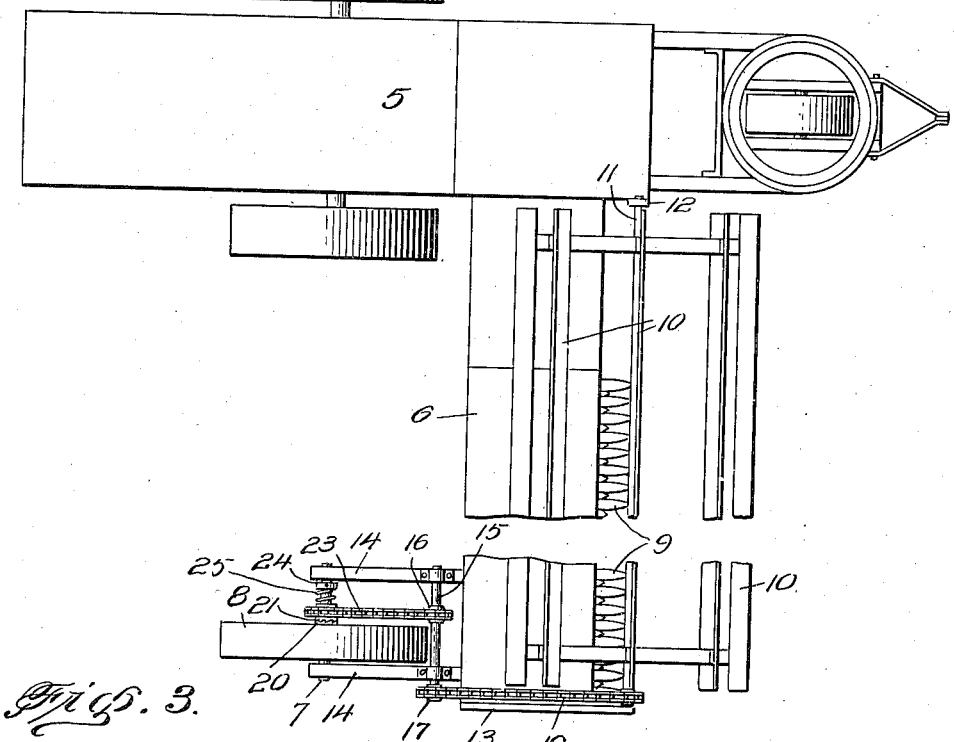
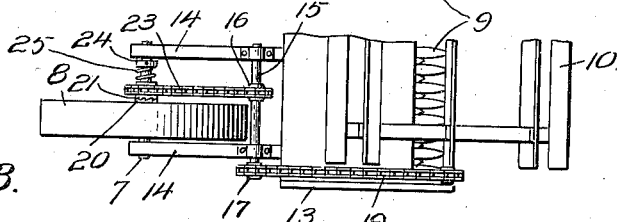
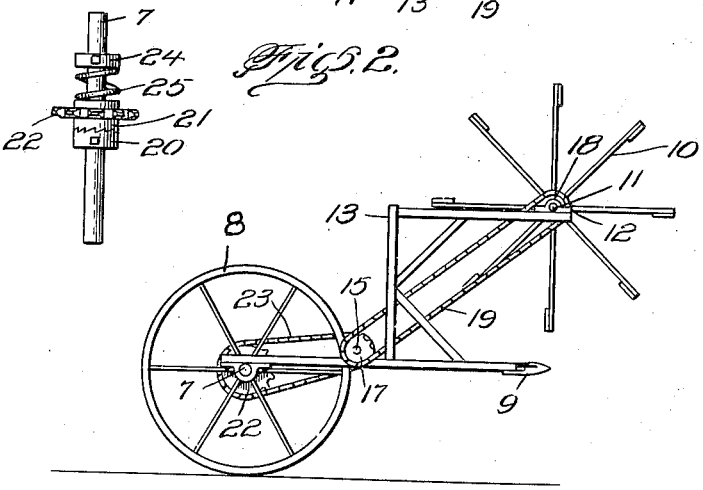
Dick Hayes.
INVENTOR
BY Victor J. Evans & Co.
ATTORNEYS Patented June 24, 1941

2,247,172

UNITED STATES PATENT OFFICE 2,247,172

REEL DRIVE FOR COMBINES

Dick Hayes, Weston, Oreg.

Application February 5, 1940, Serial No. 317,411

1 Claim. (Cl. 56—122)

My invention relates to a reel drive for combines and has as one of the principal objects thereof the provision of means for driving the reel of a combine at a constant speed together with means for stopping the rotation of the reel without stopping the draper or sickle mechanism when the combine is at a standstill.

Another object of my invention is to provide a drive of the above described character so constructed and arranged that upon backing of the combine the reel remains stationary.

A further object of my invention is to provide a drive of the above described character which is simple in construction, durable in use, efficient in operation and economical in manufacture.

Other objects and advantages will be apparent from the following description, appended claim and annexed drawing.

Referring to the drawing wherein like reference characters designate like parts throughout the several views:

Figure 1 is a top plan view of a combine equipped with my invention.

Figure 2 is a side elevation of my novel form of drive as applied to a combine and reel.

Figure 3 is a top plan view of the slip sprocket.

In practicing my invention I provide a combine having a thresher 5 and a harvester 6, the latter being mounted upon an axle 7 supported by a wheel 8 at one end thereof. The harvester 6 is equipped with a draper or sickle mechanism 9 and has mounted in superjacent relation thereto a reel 10, the latter being provided with a shaft 11 journaled in bearings 12, one of which is carried by a frame 13 at one end of the harvester as clearly illustrated in Figure 2 of the drawing.

The axle 7 is rotatably mounted in bearings on the rear ends of a pair of rearwardly extending spaced arms 14, the front ends of which are connected to the harvester. Also journaled in bearings carried by the arms 14 is a shaft 15 arranged between the harvester and the wheel 8 and said shaft 15 has fixed thereon a pair of sprockets 16 and 17, one arranged on each side of the wheel 8.

The sprocket 17 is connected to a sprocket 18 fixed on the shaft 11 through the medium of a chain 19. The axle 7 adjacent the wheel 8 has fixed thereto a clutch element 20 provided with teeth for cooperative engagement with similar teeth formed on a clutch element 21 slidably mounted on the axle 7 and said clutch element 21 has fixed thereto a sprocket 22 connected to the sprocket 16 through the medium of a chain 23.

Spaced from the clutch element 21 and axle 7 is a collar 24 and interposed between the collar 24 and clutch element 21 is a coil spring 25 for normally urging the clutch element 21 into engagement with the clutch element 20 to effect rotation of the reel 10 upon rotation of the wheel 8. Obviously, when the combine is being operated in the forward direction the wheel 8, through the medium of my novel form of drive, serves to effect rotation of the reel 10 at a constant speed and also provide means for stopping the rotation of the reel without stopping the draper or sickle mechanism 9 when the combine is at a standstill. Furthermore, the speed of the reel conforms to the speed of the combine regardless of whether it be in low, second or high gear.

When backing, due to the operation of the clutch elements 20 and 21 with respect to each other, the reel 10 remains stationary. Also, my novel form of drive permits of continued operation of the draper upon stopping of the combine, thus keeping the draper in a clean condition, thereby distinguishing over other drives of a similar character, particularly that disclosed in United States Letters Patent No. 1,717,931 granted to W. F. MacGregor, dated June 18, 1929.

Without further elaboration, the foregoing will so fully explain the invention that others may, by applying current knowledge, readily adapt the same for use under various conditions of service. Moreover, it is not indispensable that all the features of the invention be used conjointly since they may be employed advantageously in various combinations and sub-combinations.

It is obvious that the invention is not confined to the herein described use therefor as it may be utilized for any purpose to which it is adaptable. It is therefore to be understood that the invention is not limited to the specific construction as illustrated and described, as the same is only illustrative of the principles of operation, which are capable of extended application in various forms, and that the invention comprehends all construction within the scope of the appended claim.

What I claim is:

In a combine, the combination with a thresher having carrier wheels at each side thereof, a harvester extending laterally from one side of the thresher, the said harvester having sickle and draper mechanism operable independently of the carrier wheels and operative when the combine is at rest, and a reel rotatably supported above the sickle and draper mechanism, of a pair of arms attached to and extending rearwardly from the outer end portion of the harvester remote from the thresher, an axle rotatably mounted on the outer end portions of the said arms, a traction wheel fixed on the axle between the arms, a toothed clutch element secured on the axle adjacent the wheel, a complementary clutch element yieldingly urged into engagement with the first-mentioned element, a drive sprocket secured on the said yieldingly urged clutch element, an intermediate shaft rotatably mounted on the said arms forwardly of the drive wheel, a pair of sprockets secured on the said shaft, a drive chain connecting the said drive sprocket with one of the said shaft sprockets, a sprocket secured on the said reel, and a drive chain trained over the reel sprocket and one of the shaft sprockets whereby to operate the reel only when the traction wheel is rotated in a forward direction.

DICK HAYES.